United States Patent
Subramaniyan et al.

(10) Patent No.: US 10,443,405 B2
(45) Date of Patent: Oct. 15, 2019

(54) ROTOR BLADE TIP

(71) Applicant: General Electric Company, Schenectady, NY (US)

(72) Inventors: Moorthi Subramaniyan, Bangalore (IN); Adam John Fredmonski, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 241 days.

(21) Appl. No.: 15/591,242

(22) Filed: May 10, 2017

(65) Prior Publication Data

US 2018/0328191 A1 Nov. 15, 2018

(51) Int. Cl.
| | | |
|---|---|---|
| *F01D 5/18* | (2006.01) | |
| *F02C 3/04* | (2006.01) | |
| *F01D 5/20* | (2006.01) | |
| *F01D 5/30* | (2006.01) | |

(52) U.S. Cl.
CPC .............. *F01D 5/187* (2013.01); *F01D 5/20* (2013.01); *F02C 3/04* (2013.01); *F01D 5/3007* (2013.01); *F05D 2220/32* (2013.01); *F05D 2240/307* (2013.01); *F05D 2240/35* (2013.01); *F05D 2260/202* (2013.01)

(58) Field of Classification Search
CPC .......... F01D 5/187; F01D 5/20; F01D 5/3007; F02C 3/04; F05D 2260/202; F05D 2240/307; F05D 2240/35; F05D 2220/32
USPC ....................................................... 415/115
See application file for complete search history.

(56) References Cited

U.S. PATENT DOCUMENTS

| | | | |
|---|---|---|---|
| 4,761,116 A | | 8/1988 | Braddy et al. |
| 5,282,721 A | | 2/1994 | Kildea |
| 5,503,527 A | * | 4/1996 | Lee ............................ F01D 5/20 415/173.1 |
| 5,927,946 A | * | 7/1999 | Lee ............................ F01D 5/20 415/115 |
| 5,980,209 A | * | 11/1999 | Barry ....................... F01D 5/141 416/193 A |
| 6,059,530 A | | 5/2000 | Lee |

(Continued)

FOREIGN PATENT DOCUMENTS

| | | |
|---|---|---|
| EP | 1840332 A1 | 10/2007 |
| EP | 2093378 A1 | 8/2009 |

(Continued)

OTHER PUBLICATIONS

Lomakin et al., Effect of Various Tip Clearance Squealer Design on Turbine Stage Efficiency, ASME. Turbo Expo 2015: Power for Land, Sea, and Air, vol. 2A: GT2015-4276, Jun. 15-19, 2015, Montreal CA.

*Primary Examiner* — J. Todd Newton
(74) *Attorney, Agent, or Firm* — Dority & Manning, P.A.

(57) ABSTRACT

A rotor blade includes an airfoil. The airfoil includes a leading edge and a trailing edge downstream of the leading edge. The airfoil also includes a radially outer tip with a pressure side tip rail and a suction side tip rail. A slot is formed in an aft portion of the suction side tip rail and an opening is positioned between the suction side tip rail and the pressure side tip rail at the trailing edge. Gas flows from the tip via the slot and the opening to inhibit formation of a vortex flow proximate to the suction side of the airfoil.

20 Claims, 8 Drawing Sheets

(56) References Cited

U.S. PATENT DOCUMENTS

| | | | | |
|---|---|---|---|---|
| 6,478,537 B2* | 11/2002 | Junkin | | B23P 6/002 415/173.1 |
| 6,923,623 B2* | 8/2005 | Cleveland | | F01D 5/141 416/92 |
| 7,118,329 B2 | 10/2006 | Goodman | | |
| 7,513,743 B2* | 4/2009 | Liang | | F01D 5/20 415/173.6 |
| 7,704,047 B2* | 4/2010 | Liang | | F01D 5/186 416/97 R |
| 8,075,268 B1* | 12/2011 | Liang | | F01D 5/186 416/92 |
| 8,182,221 B1* | 5/2012 | Liang | | F01D 5/087 415/115 |
| 8,414,262 B2 | 4/2013 | Hada | | |
| 8,512,003 B2* | 8/2013 | Klasing | | F01D 5/20 416/228 |
| 8,684,691 B2 | 4/2014 | Lee et al. | | |
| 10,001,019 B2* | 6/2018 | Chouhan | | F02C 3/04 |
| 2004/0179940 A1* | 9/2004 | Liang | | F01D 5/08 416/97 R |
| 2009/0148305 A1* | 6/2009 | Riahi | | F01D 5/147 416/97 R |
| 2010/0098554 A1* | 4/2010 | Cheong | | F01D 5/20 416/97 R |
| 2010/0111704 A1* | 5/2010 | Hada | | F01D 5/20 416/97 R |
| 2011/0135496 A1* | 6/2011 | Botrel | | F01D 5/20 416/96 R |
| 2013/0108444 A1* | 5/2013 | Stein | | F01D 5/20 416/91 |
| 2013/0142651 A1* | 6/2013 | Lim | | F01D 5/145 416/91 |
| 2014/0037458 A1* | 2/2014 | Lacy | | F01D 5/186 416/97 R |
| 2014/0311164 A1* | 10/2014 | Kwon | | F01D 5/20 60/806 |
| 2015/0118063 A1* | 4/2015 | Lewis | | F01D 5/20 416/97 R |
| 2015/0292334 A1* | 10/2015 | Mongillo, Jr. | | F01D 5/20 416/97 R |
| 2015/0292335 A1* | 10/2015 | Dawson | | F01D 5/145 416/97 R |
| 2016/0258301 A1 | 9/2016 | Chouhan et al. | | |
| 2016/0319672 A1* | 11/2016 | Jones | | F01D 5/20 |
| 2017/0058680 A1* | 3/2017 | Chouhan | | F01D 5/20 |
| 2017/0252875 A1* | 9/2017 | Srinivasan | | C22C 19/05 |
| 2018/0073370 A1* | 3/2018 | Mottram | | F01D 5/186 |
| 2018/0328191 A1* | 11/2018 | Subramaniyan | | F01D 5/20 |

FOREIGN PATENT DOCUMENTS

| | | | | |
|---|---|---|---|---|
| EP | 2148042 A2 | | 1/2010 | |
| EP | 3366886 A1 * | | 8/2018 | ............... F01D 5/20 |
| FR | 3027951 A1 * | | 5/2016 | ............... F01D 5/20 |
| WO | WO-2016007116 A1 * | | 1/2016 | ............... F01D 5/20 |
| WO | WO-2017146680 A1 * | | 8/2017 | ............... F01D 5/20 |

* cited by examiner

ROTOR BLADE TIP

FIELD

The present invention generally relates to a rotor blade for a turbomachine. More particularly, this invention involves a rotor blade having a tip with vortex cancellation features.

BACKGROUND

Turbomachines are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The turbine section typically includes multiple stages which are disposed along the hot gas path such that the hot gases flow through first-stage nozzles and rotor blades and through the nozzles and rotor blades of follow-on turbine stages. The turbine rotor blades may be secured to a plurality of rotor disks comprising the turbine rotor, with each rotor disk being mounted to the rotor shaft for rotation therewith.

A turbine rotor blade generally includes an airfoil extending radially outwardly from a substantially planar platform and a shank portion extending radially inwardly from the platform for securing the rotor blade to one of the rotor disks. The tip of the airfoil is typically spaced radially inwardly from a stationary shroud of the turbomachine such that a small gap is defined between the tip and the shroud. This gap is typically sized as small as practical to minimize the flow of hot gases between the airfoil tip and the shroud.

In many instances, the tip of the airfoil may include a squealer tip wall extending around the perimeter of the airfoil so as to define a tip cavity and a tip floor therebetween. The squealer tip wall is generally used to reduce the size of the gap defined between the airfoil tip and the shroud. However, this creates an additional component of the turbine rotor blade that is subject to heating by the hot gas flowing around the airfoil. Thus, cooling holes are typically defined in the tip floor to allow a cooling medium to be directed from an airfoil cooling circuit within the airfoil to the tip cavity. Although the squealer tip wall reduces the size of the gap defined between the airfoil tip and the shroud, some over tip leakage can roll over the tip wall. Such flows may result in formation of a strong vortex flow on the suction side of the blade surface, which leads to entropy generation and loss in performance.

BRIEF DESCRIPTION

Aspects and advantages of the invention are set forth below in the following description, or may be obvious from the description, or may be learned through practice of the invention.

According to one example embodiment, a rotor blade is provided. The rotor blade includes an airfoil. The airfoil includes a leading edge and a trailing edge downstream of the leading edge. The airfoil also includes a root extending between the leading edge and the trailing edge and a tip spaced radially outward from the root. The tip includes a tip floor. The airfoil also includes a pressure side wall extending between the root and the tip and extending between the leading edge and the trailing edge. The airfoil further includes a suction side wall extending between the root and the tip and extending between the leading edge and the trailing edge. The suction side wall opposes the pressure side wall. The airfoil also includes a pressure side tip rail that extends radially outwardly from the tip floor between the leading edge and the trailing edge along the pressure side wall and a suction side tip rail that extends radially outwardly from the tip floor between the leading edge and the trailing edge along the suction side wall. A tip cavity is defined by the tip floor, the pressure side tip rail and the suction side tip rail. The tip cavity defines a radial extent outward of the tip floor. A slot is formed in an aft portion of the suction side tip rail. Gas flows from the tip cavity via the slot and the opening, and the gas flow from the tip cavity inhibits formation of a vortex flow proximate to the suction side wall.

In accordance with another example embodiment, a gas turbine is provided. The gas turbine includes a compressor, a combustor disposed downstream from the compressor, and a turbine disposed downstream from the combustor. The turbine includes a rotor shaft extending axially through the turbine, an outer casing circumferentially surrounding the rotor shaft to define a hot gas path therebetween and a plurality of rotor blades interconnected to the rotor shaft and defining a stage of rotor blades. Each rotor blade includes a mounting portion including a mounting body, the mounting body being interconnectable with the rotor shaft, and an airfoil coupled to the mounting portion. The airfoil includes a leading edge and a trailing edge downstream of the leading edge. The airfoil also includes a root extending between the leading edge and the trailing edge and a tip spaced radially outward from the root. The tip includes a tip floor. The airfoil also includes a pressure side wall extending between the root and the tip and extending between the leading edge and the trailing edge. The airfoil further includes a suction side wall extending between the root and the tip and extending between the leading edge and the trailing edge. The suction side wall opposes the pressure side wall. The airfoil also includes a pressure side tip rail that extends radially outwardly from the tip floor between the leading edge and the trailing edge along the pressure side wall and a suction side tip rail that extends radially outwardly from the tip floor between the leading edge and the trailing edge along the suction side wall. A tip cavity is defined by the tip floor, the pressure side tip rail and the suction side tip rail. The tip cavity defines a radial extent outward of the tip floor. A slot is formed in an aft portion of the suction side tip rail. Gas flows from the tip cavity via the slot and the opening, and the gas flow from the tip cavity inhibits formation of a vortex flow proximate to the suction side wall.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
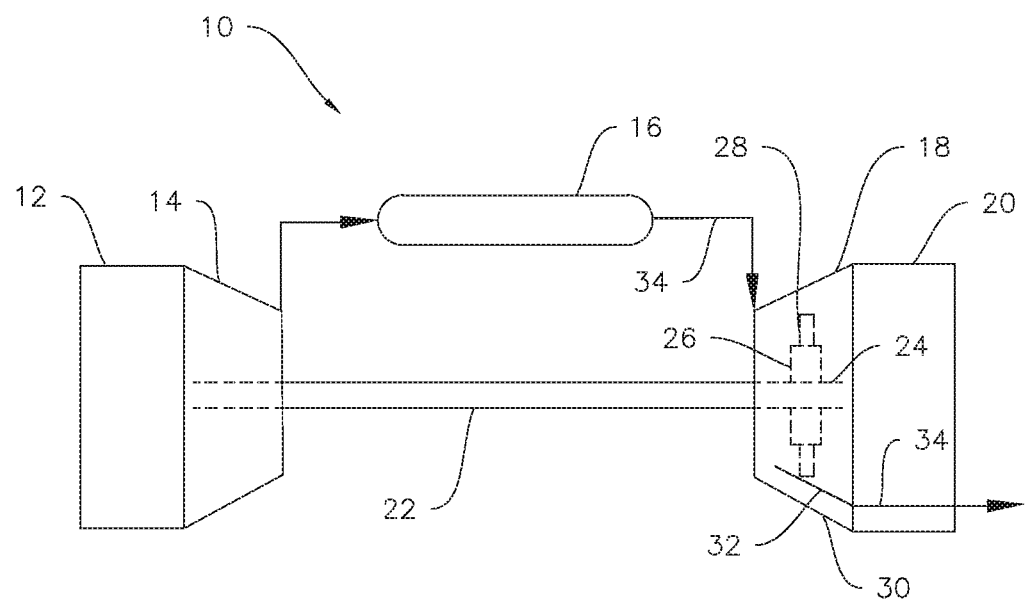
FIG. 1 illustrates a functional diagram of an exemplary gas turbine as may incorporate at least one embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbine including but not limited to a steam turbine, an aircraft gas turbine or marine gas turbine.

Referring now to the drawings, FIG. 1 illustrates a schematic diagram of one embodiment of a gas turbine 10. The gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotor blades 28 extending radially outwardly from and being interconnected to each rotor disk 26. Each rotor disk 26 may, in turn, be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce hot gases of combustion 34. The hot gases of combustion 34 flow through the hot gas path 32 from the combustor section 16 to the turbine section 18, wherein energy (kinetic and/or thermal) is transferred from the hot gases 34 to the rotor blades 28, thus causing the rotor shaft 24 to rotate. The mechanical rotational energy may then be used, e.g., to power the compressor section 14 and generate electricity. The hot gases of combustion 34 exiting the turbine section 18 may then be exhausted from the gas turbine 10 via the exhaust section 20.

Figure 2:
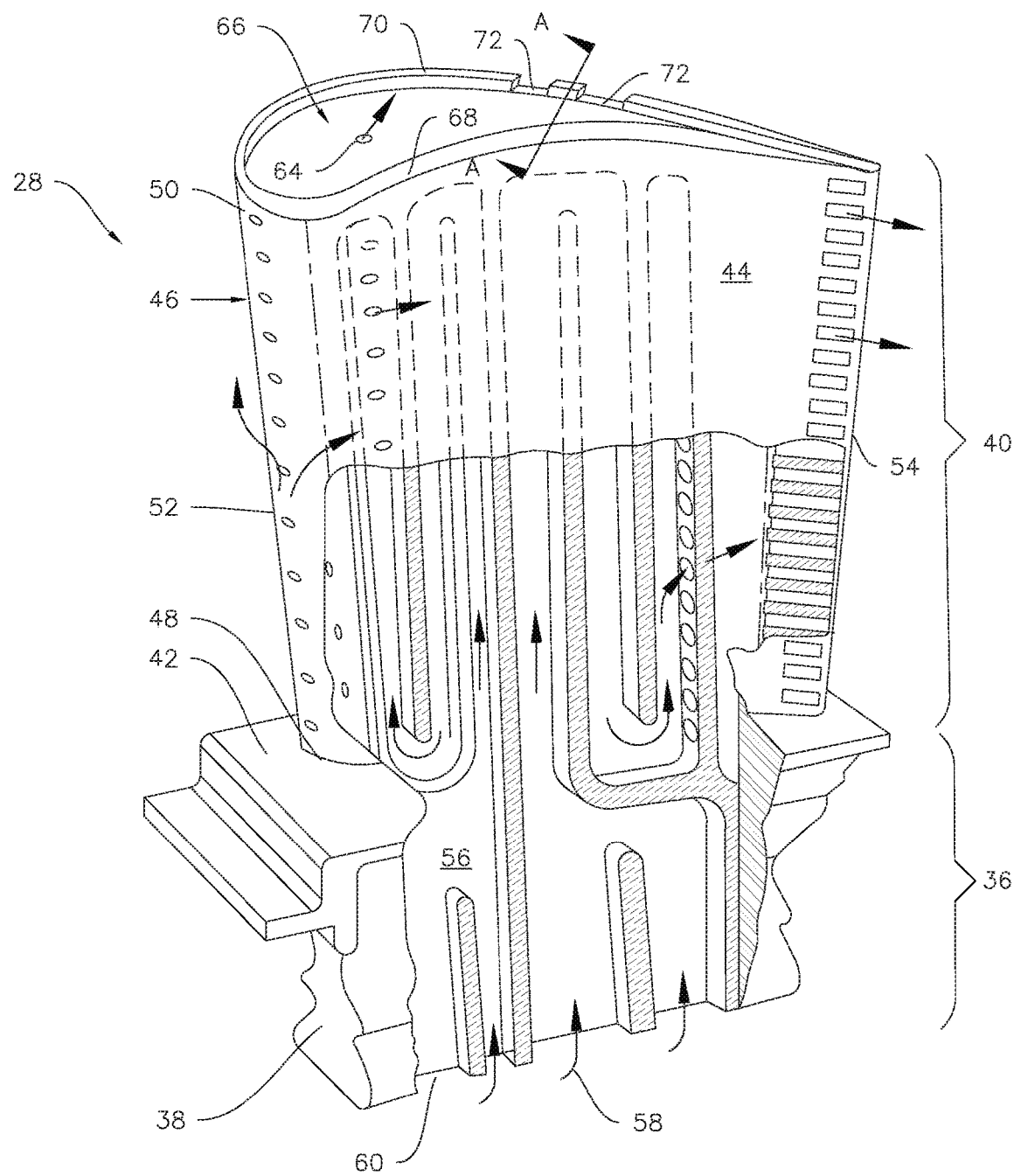
FIG. 2 is a perspective view of an exemplary rotor blade as may incorporate various embodiments of the present disclosure.

FIG. 2 is a perspective view of an exemplary rotor blade 28 as may incorporate one or more embodiments of the present invention. As shown in FIG. 2, the rotor blade 28 generally includes a mounting or shank portion 36 having a mounting body 38 and an airfoil 40 that extends substantially radially outwardly from a substantially planar platform 42. The platform 42 generally serves as the radially inward boundary for the hot gases of combustion 34 flowing through the hot gas path 32 of the turbine section 18 (FIG. 1). As shown in FIG. 2, the mounting body 38 of the mounting or shank portion 36 may extend radially inwardly from the platform 42 and may include a root structure, such as a dovetail, configured to interconnect or secure the rotor blade 28 to the rotor disk 26 (FIG. 1).

The airfoil 40 includes a pressure side wall 44 and an opposing suction side wall 46. The pressure side wall 44 and the suction side wall 46 extend substantially radially outwardly from the platform 42 in span from a root 48 of the airfoil 40 which may be defined at an intersection between the airfoil 40 and the platform 42, and a tip 50 of the airfoil 40. The airfoil 40 defines a chord C (FIG. 3), which is defined by a straight line extending between a leading edge 52 of the airfoil 40 and a trailing edge 54 downstream of the leading edge 52. The pressure side wall 44 generally comprises an aerodynamic, concave external surface of the airfoil 40. Similarly, the suction side wall 46 may generally define an aerodynamic, convex external surface of the airfoil 40. The tip 50 is disposed radially opposite the root 48. As such, the tip 50 may generally define the radially outermost portion of the rotor blade 28 and, thus, may be configured to be positioned adjacent to a stationary shroud or seal (not shown) of the gas turbine 10. The tip 50 includes a tip cavity 66.

As shown in FIG. 2, a plurality of cooling passages 56 (shown partially in dashed lines in FIG. 2) is circumscribed within the airfoil 40 for routing a coolant 58 through the airfoil 40 between the pressure side wall 44 and the suction side wall 46, thus providing convective cooling thereto. The coolant 58 may include a portion of the compressed air from the compressor section 14 (FIG. 1) and/or steam or any other suitable fluid or gas for cooling the airfoil 40. One or more cooling passage inlets 60 are disposed along the rotor blade 28. In some embodiments, one or more cooling passage inlets 60 are formed within, along or by the mounting body 38. The cooling passage inlets 60 are in fluid communication with at least one corresponding cooling passage 56.

Figure 3:
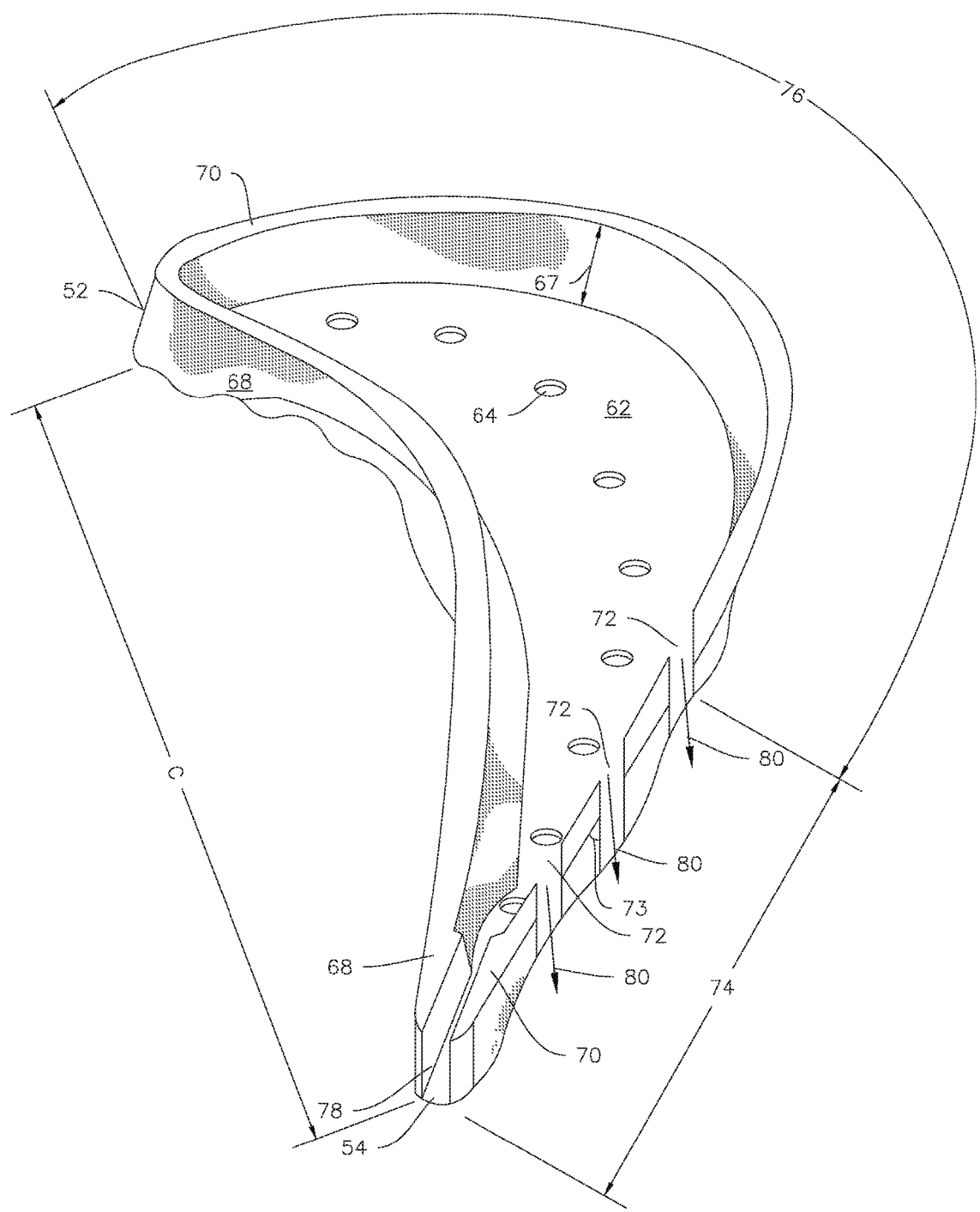
FIG. 3 is a top view of the exemplary rotor blade as shown in FIG. 2, according to some embodiments of the disclosure.

FIG. 3 is an enlarged view of the tip 50 of the airfoil 40 as shown in FIG. 2, according to one embodiment of the present disclosure. As shown in FIG. 3, the tip 50 includes a tip floor 62. The tip floor 62 generally extends between the pressure and suction side walls 44, 46 and the leading and trailing edges 52, 54 of the airfoil 40. A plurality of coolant outlets 64 may be in fluid communication with the tip cavity 66. For example, in some embodiments, the plurality of coolant outlets may be disposed along the tip floor 62. Each cooling passage 56 (FIG. 2) is in fluid communication with at least one of the coolant outlets 64.

As shown in FIG. 3, the tip cavity 66 is at least partially surrounded by a pressure side tip rail 68 and a suction side tip rail 70. Each tip rail 68, 70 extends radially outwardly from the tip floor 62. The pressure side tip rail 68 extends along a perimeter of the tip floor 62 between the leading edge 52 and the trailing edge 54 and generally conforms in profile to the pressure side wall 44. The suction side tip rail 70 extends along the perimeter of the tip floor 62 between the leading edge 52 and the trailing edge 54 and generally conforms in profile to the suction side wall 46. The pressure side tip rail 68 and the suction side tip rail 70 are joined at the leading edge 52. Accordingly, the tip cavity 66 is defined by the tip floor 62, the pressure side tip rail 68 and the suction side tip rail 70. The tip cavity 66 extends radially outward from the tip floor 62, defining a radial extent 67 outward of the tip floor 62.

Some embodiments may include one or more slots 72 formed in an aft portion 74 of the suction side tip rail 70. In some embodiments, a plurality of slots 72 may be formed in the aft portion 74 of the suction side tip rail 70. For example, as illustrated in FIG. 2, two slots may be provided. As another example, as illustrated in FIG. 3, three slots may be provided. In other embodiments, additional slots 72, e.g., four, five, or more slots, may be provided.

In some embodiments, the suction side tip rail 70 may be continuous over a forward portion 76, e.g., no slots 72 may be formed in the forward portion 76, and the suction side tip rail 70 may include slots 72 only in the aft portion 74. The forward portion 76 is forward (upstream) of the aft portion 74, such that the forward portion 76 extends between the aft portion 74 and the leading edge 52, and the aft portion 74 extends between the forward portion 76 and the trailing edge 54.

The forward portion 76 may be at least half of the chordal extent of the suction side 70, e.g., the forwardmost slot 72 may be positioned about halfway between the leading edge 52 and the trailing edge 54 along the direction of the chord C. In such embodiments, the aft portion 74 of the suction side tip rail 70 may make up the remaining portion, e.g., about half, of the suction side tip rail 70. In some embodiments, the aft portion 74 of the suction side tip rail 70 may extend over less than half of the chordal extent of the suction side tip rail 70. In some embodiments, the forward portion 76 may be about seventy percent of the chordal extent of the suction side tip rail 70. In some embodiments, the aft portion 74 of the suction side tip rail 70 may include about twenty percent of the chordal extent of the suction side tip rail 70. As used herein, terms of approximation such as "about" includes within ten percent more or less than the stated value. For example, when the stated value is a percent, "about" includes within ten percentage points more or less than the stated value, e.g., "about seventy percent" encompasses an inclusive range from sixty percent to eighty percent.

In some embodiments, the forward portion 76 may be about seventy-five percent (75%) of the chordal extent of the suction side tip rail 70, such that the forwardmost edge of the first or forwardmost slot 72 is spaced from the leading edge 52 by about seventy-five percent (75%) of the distance C between the leading edge 52 and the trailing edge 54. In such embodiments, the first slot 72 may extend over two and a half percent (2.5%) of the chordal extent of the suction side tip rail 70, such that the aft edge of the first slot 72 may be spaced from the leading edge 52 by about seventy-seven and a half percent (77.5%) of the distance C between the leading edge 52 and the trailing edge 54. Further, some such embodiments may also include a plurality of slots 72. For example, a second slot 72 may be provided aft of the first slot 72 by about four percent (4%) of the chordal extent of the suction side tip rail 70. Accordingly, the forwardmost edge of the second slot 72 may be spaced from the leading edge 52 by about eighty-one and a half percent (81.5%) of the distance C between the leading edge 52 and the trailing edge 54. In such embodiments, the second slot 72 may extend over two and a half percent (2.5%) of the chordal extent of the suction side tip rail 70, such that the aft edge of the second slot 72 may be spaced from the leading edge 52 by about eighty four percent (84%) of the distance C between the leading edge 52 and the trailing edge 54. In some exemplary embodiments, a third slot 72 may also be provided. In such embodiments, the third slot 72 may be provided aft of the second slot 72 by about four percent (4%) of the chordal extent of the suction side tip rail 70. Accordingly, the forwardmost edge of the third slot 72 may be spaced from the leading edge 52 by about eighty-eight percent (88%) of the distance C between the leading edge 52 and the trailing edge 54. In such embodiments, the third slot 72 may extend over two and a half percent (2.5%) of the chordal extent of the suction side tip rail 70, such that the aft edge of the third slot 72 may be spaced from the leading edge 52 by about ninety and a half percent (90.5%) of the distance C between the leading edge 52 and the trailing edge 54.

Also illustrated in FIG. 3, some embodiments may include an opening 78 between the suction side tip rail 70 and the pressure side tip rail 68 at the trailing edge 54. Slots 72 and opening 78 may advantageously provide a vortex-cancelling flow, as indicated by arrows 80, to disrupt and/or prevent vortex formation on the suction side of the airfoil 40. For example, in the illustrated embodiments, gas flows into the tip cavity 66 from the coolant outlets 64 and gas also flows into the tip cavity 66 over the top of the pressure side tip rail 68. Such gas may then flow out of the tip cavity 66. For example, the gas may flow from the tip cavity 66 via the slots 72 and the opening 78, and may inhibit formation of a vortex flow proximate to the suction side wall 46.

In various embodiments, as shown and described herein, various combinations and configurations of the one or more slots 72 and the opening 78 may be provided in the aft portion 74 of the suction side tip rail 70. In contrast, no slots 72 or openings 78 may be provided in the forward portion 76 of the suction side tip rail 70 or in the pressure side tip rail 68. Thus, the pressure side tip rail 68 may be continuous and uninterrupted along the pressure side wall 44. Also, the pressure side tip rail 68 may define a constant radial height, and the pressure side tip rail 68 may be continuous and uninterrupted over the constant radial height. Similarly, the suction side tip rail 70 may consist of the forward portion 76 and the aft portion 74. The forward portion 76 of the suction side tip rail 70 may be continuous and uninterrupted along the suction side wall 46 from the aft portion 74 to the leading edge 52. The forward portion 76 of the suction side tip rail 70 may also define a constant radial height, and the forward portion 76 of the suction side tip rail 70 may be continuous and uninterrupted over the constant radial height.

As illustrated in FIG. 3, the one or more slots 72 may form an angle 73 with the suction side wall 46. In various embodiments, the angle 73 may be between about thirty twenty-five degrees and about sixty-five degrees. For example, the angle 73 may be between about thirty degrees and about sixty degrees. For example, the angle 73 may be between about forty degrees and about fifty degrees. For example, the angle 73 may be about forty-five degrees. As used herein, "about" in the context of an angle or direction means within ten degrees above or below the stated value. In other embodiments, any suitable angle 73 may be provided. As yet another non-limiting example, the one or more slots 72 may be normal to the suction side wall 46, e.g., the angle 73 may be about ninety degrees.

Figure 4:
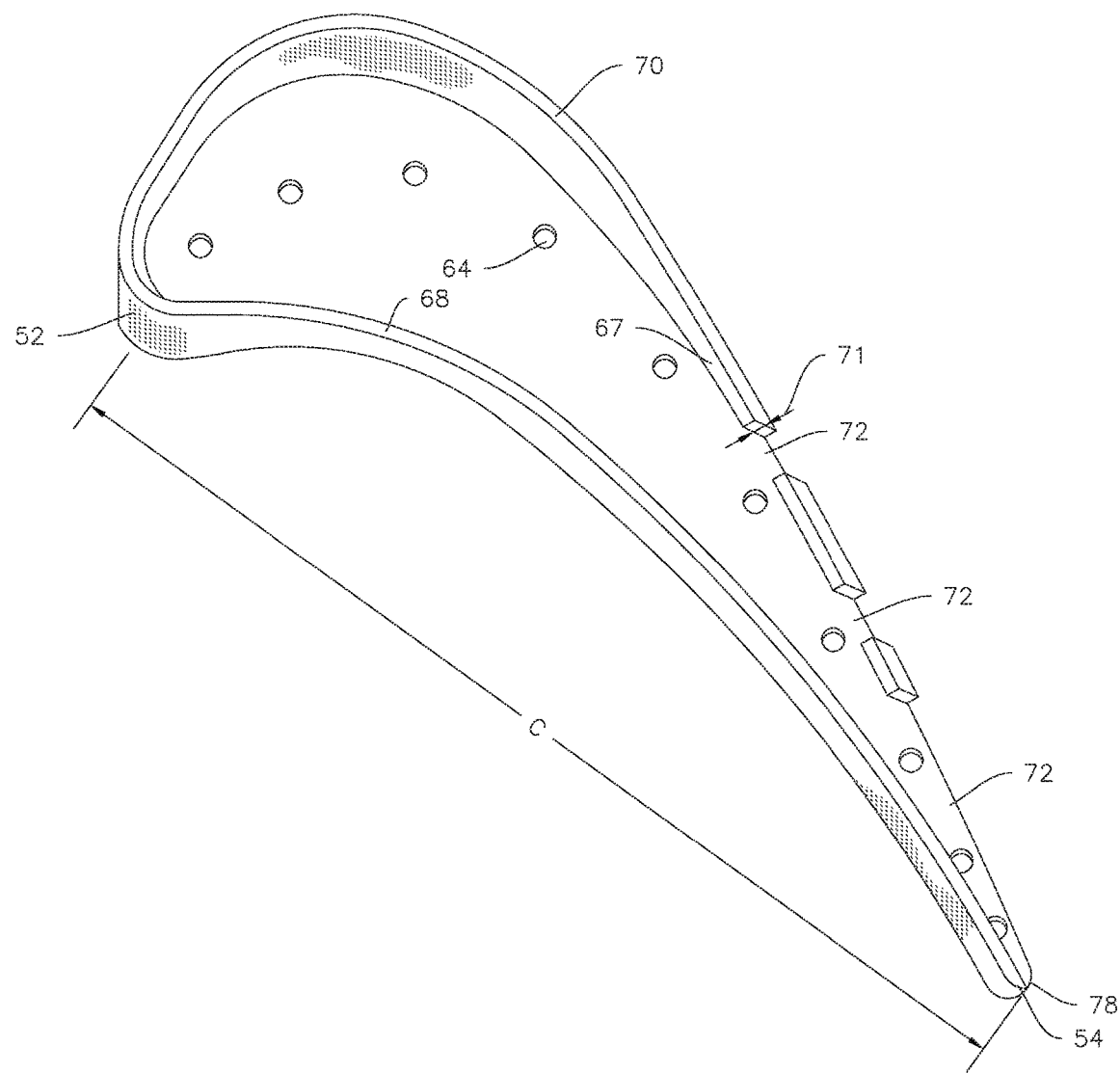
FIG. 4 is a top view of the exemplary rotor blade as shown in FIG. 2, according to some embodiments of the disclosure.
Figures 5, 6:
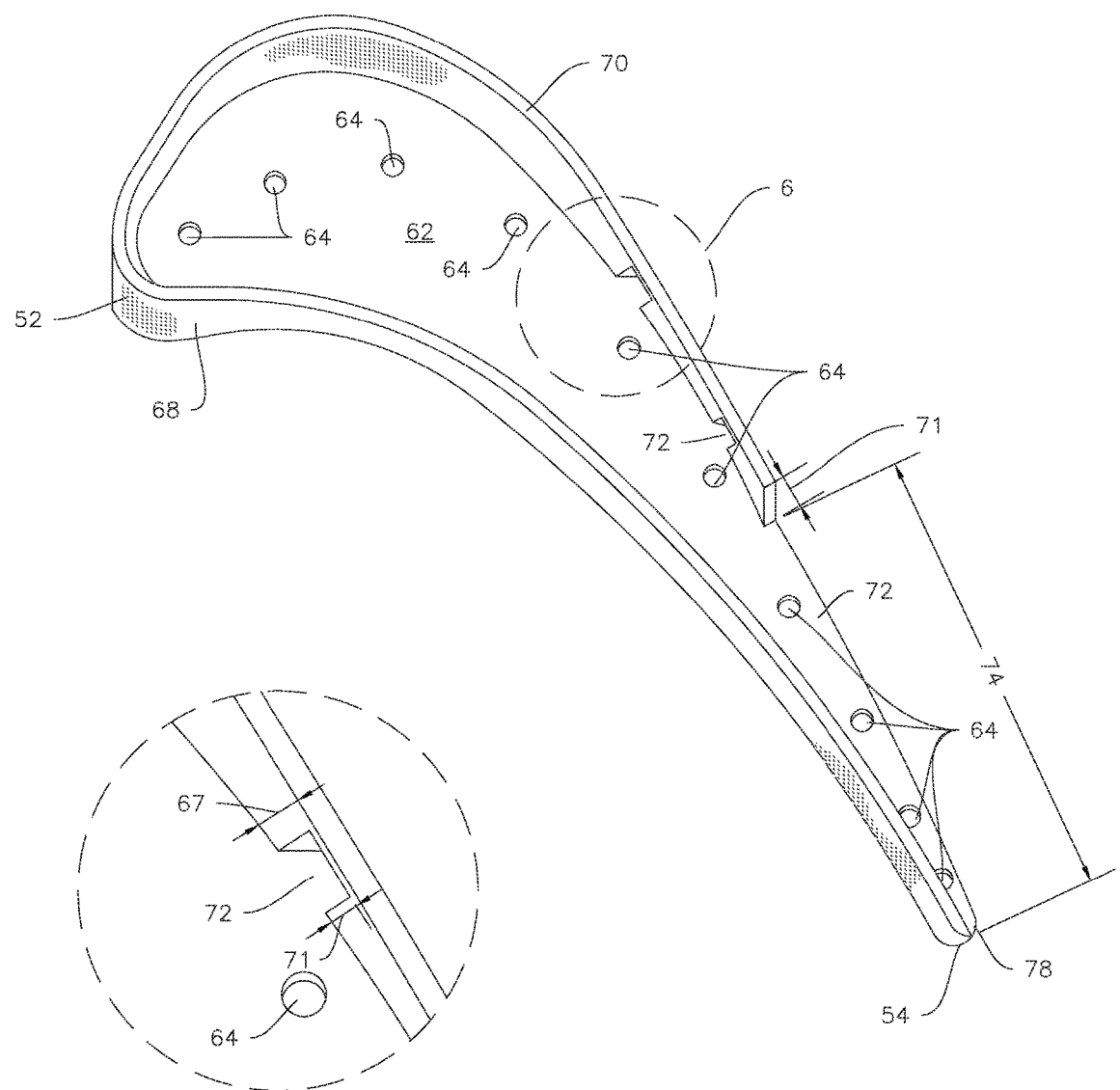
FIG. 5 is a top view of the exemplary rotor blade as shown in FIG. 2, according to some embodiments of the disclosure.
FIG. 6 is an enlarged view of a portion of FIG. 5.
Figure 7:
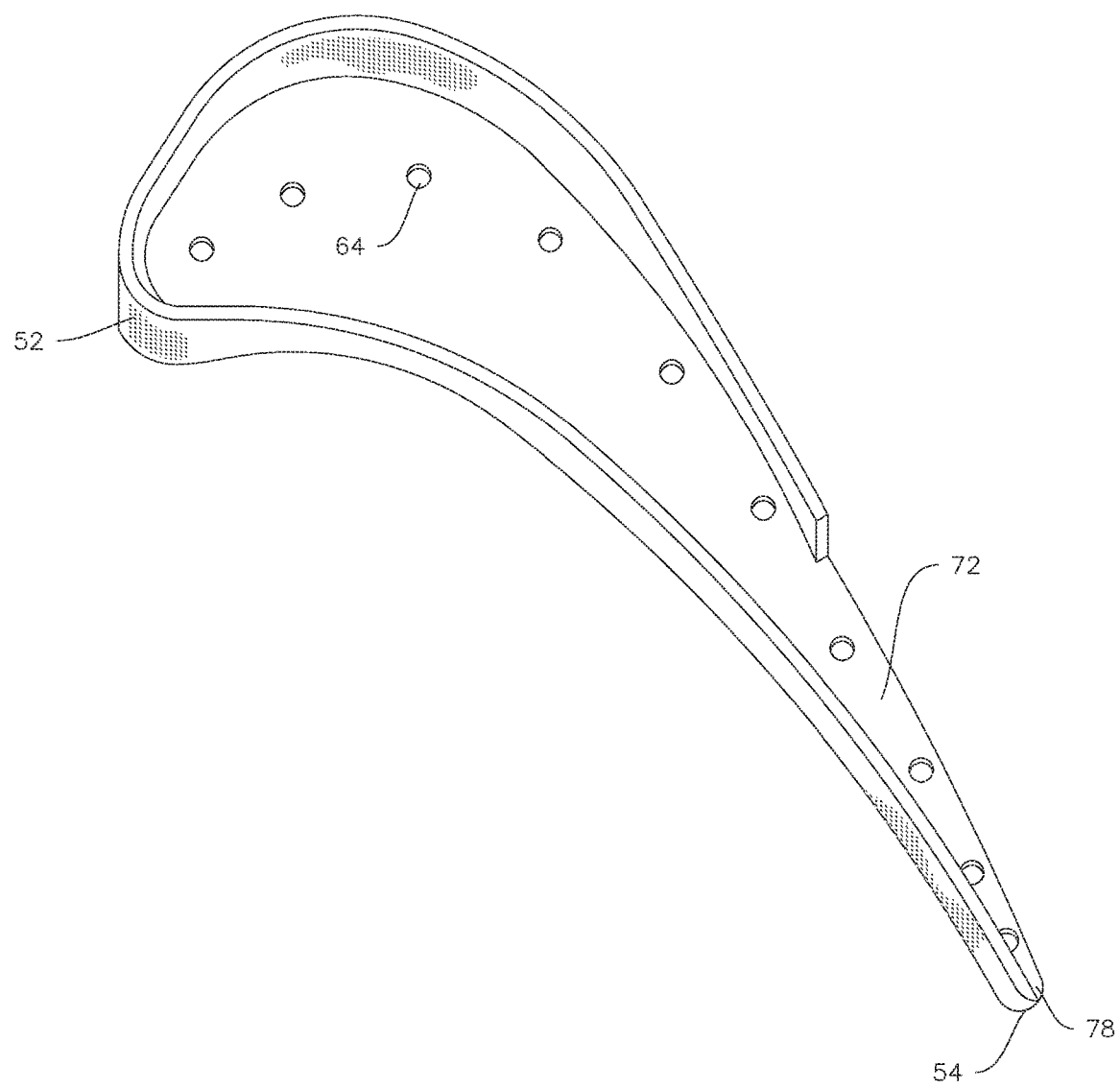
FIG. 7 is a top view of the exemplary rotor blade as shown in FIG. 2, according to some embodiments of the disclosure.

In some embodiments, for example as illustrated in FIG. 3, the slots 72 may be distinct from the opening 78. In other embodiments, e.g., as illustrated in FIGS. 4 and 5, a plurality of slots 72 may be provided, and one slot 72 of the plurality of slots 72 may be contiguous with the opening 78, e.g., one of the slots 72 may merge with the opening 78 such that the aftmost portion of the suction side tip rail 70 is completely open. In such embodiments, the suction side tip rail 70 may not extend fully to the trailing edge 54 along the suction side wall 46. In some embodiments, e.g., as illustrated in FIG. 7, a single slot 72 may be provided. In embodiments where a single slot 72 is provided, the slot may be distinct from the opening, for example, any one of the several such slots 72 illustrated in FIGS. 3 through 5 may be a single slot 72. In other embodiments where a single slot 72 is provided, the slot may be contiguous with the opening 78, as illustrated for example in FIG. 7.

As noted above, the tip cavity 66 may define a radial extent 67. Further, in some embodiments, the slot 72 may define a height 71 (FIGS. 4 and 5) radially outward of the tip floor 62. In some embodiments, the slot 72 may be radially coextensive with the suction side tip rail 70, e.g., the height 71 of the slot 72 may be the same as the radial extent 67 of the tip cavity 66, for example as illustrated in FIGS. 3 and 4. In some embodiments, e.g., as illustrated in FIG. 6, the height 71 of the slot 72 may be less than the radial extent 67 of the tip cavity 66.

Figure 8:
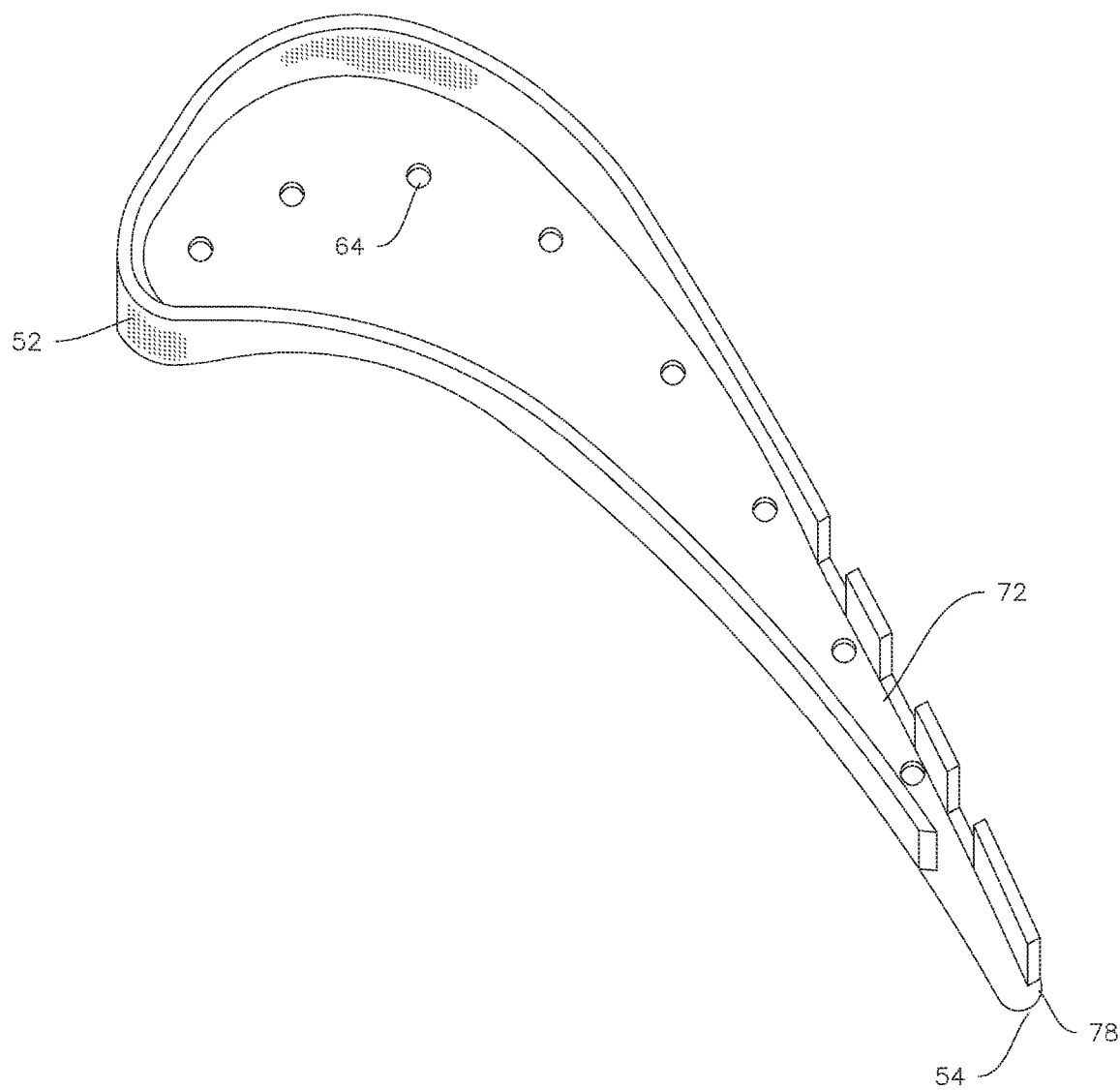
FIG. 8 is a top view of the exemplary rotor blade as shown in FIG. 2, according to alternative embodiments of the disclosure.

As illustrated in FIG. 8, in at least one alternative embodiment, the pressure side tip rail 68 may not extend fully to the trailing edge 54.

Figure 9:
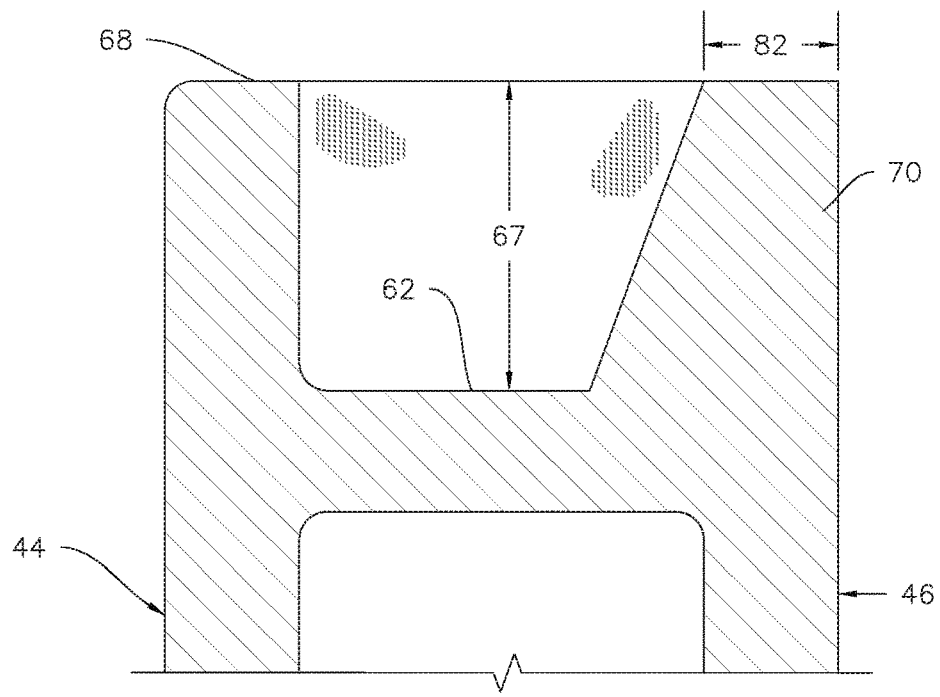
FIG. 9 is a partial section view of the rotor blade of FIG. 2 taken along line A-A in FIG. 2 according to some embodiments of the disclosure.

Some embodiments of the suction side tip rail 70 may be structurally reinforced, in particular in sections of the suction side tip rail 70 between slots 72. For example, as illustrated in FIG. 9, the suction side tip rail 70 may defines a thickness 82 along a direction perpendicular to the radial extent 67 of the tip cavity 66. The suction side tip rail 70 may be thickened near the bottom, particularly in sections of the suction side tip rail 70 between slots 72. For example, the aft portion 74 of the suction side tip rail 70 may be thickest at the bottom, e.g., may have a maximum thickness proximate to the tip floor 62 with the thickness 82 decreasing over the radial extent 67 of the tip cavity 66.

Figure 10:
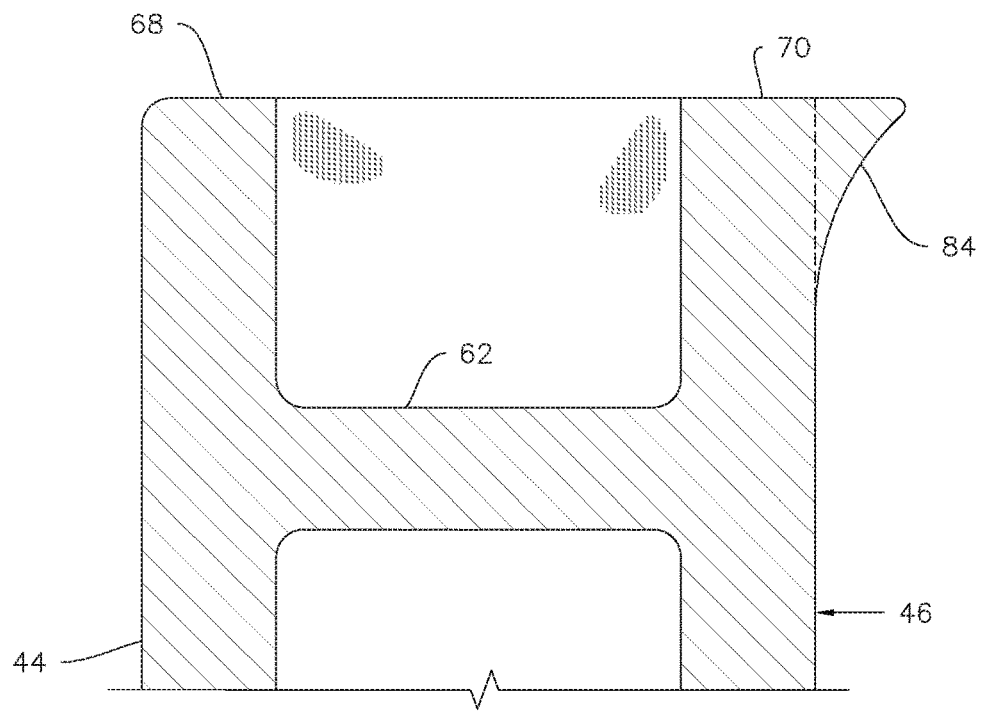
FIG. 10 is a partial section view of the rotor blade of FIG. 2 taken along line A-A in FIG. 2 according to some embodiments of the disclosure.

In some embodiments, the suction side tip rail 70 may include a flare 84, as illustrated in FIG. 10. Accordingly, embodiments of the present disclosure are equally applicable to a flared or un-flared suction side tip rail 70. For example, various combinations and configurations of the one or more slots 72 and the opening 78 may be provided in either a flared or un-flared suction side tip rail 70. The structure and function of the flare 84 is generally understood in the art and not discussed further herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:
1. A rotor blade, comprising:
an airfoil, the airfoil comprising:
  a leading edge;
  a trailing edge downstream of the leading edge;
  a root extending between the leading edge and the trailing edge;
  a tip spaced radially outward from the root, the tip including a tip floor;
  a pressure side wall extending between the root and the tip and extending between the leading edge and the trailing edge;
  a suction side wall extending between the root and the tip and extending between the leading edge and the trailing edge, the suction side wall opposing the pressure side wall;
  a pressure side tip rail that extends radially outwardly from the tip floor between the leading edge and the trailing edge along the pressure side wall;
  a suction side tip rail that extends radially outwardly from the tip floor between the leading edge and the trailing edge along the suction side wall;
  a tip cavity defined by the tip floor, the pressure side tip rail and the suction side tip rail, the tip cavity defining a radial extent outward of the tip floor;
  a first slot formed in an aft portion of the suction side tip rail;
  an opening between the suction side tip rail and the pressure side tip rail at the trailing edge; and
  a second slot formed in the aft portion of the suction side tip rail, the second slot between the first slot and the opening;
  wherein gas flows from the tip cavity via the slot and the opening, and the gas flow from the tip cavity inhibits formation of a vortex flow proximate to the suction side wall.

2. The rotor blade of claim 1, wherein the second slot is contiguous with the opening.

3. The rotor blade of claim 1, wherein gas flows over the top of the pressure side tip rail into the tip cavity.

4. The rotor blade of claim 1, wherein the first slot defines a height radially outward of the tip floor and the height of the first slot is less than the radial extent of the tip cavity.

5. The rotor blade of claim 1, wherein the aft portion of the suction side tip rail comprises half of the chordal extent of the suction side tip rail.

6. The rotor blade of claim 1, wherein the aft portion of the suction side tip rail comprises less than half of the chordal extent of the suction side tip rail.

7. The rotor blade of claim 1, wherein the aft portion of the suction side tip rail comprises twenty percent of the chordal extent of the suction side tip rail.

8. The rotor blade of claim 1, wherein the suction side tip rail does not extend fully to the trailing edge along the suction side wall.

9. The rotor blade of claim 1, wherein the suction side tip rail defines a thickness along a direction perpendicular to the radial extent of the tip cavity, the aft portion of the suction side tip rail having a maximum thickness proximate to the tip floor, the thickness decreasing over the radial extent of the tip cavity.

10. The rotor blade of claim 1, wherein the first slot forms an angle between about twenty-five degrees and about sixty-five degrees with the suction side wall.

11. The rotor blade of claim 1, wherein the first slot forms an angle of about ninety degrees with the suction side wall.

12. The rotor blade of claim 1, wherein the pressure side tip rail is continuous and uninterrupted along the pressure side wall, the pressure side tip rail defines a constant radial height, and the pressure side tip rail is continuous and uninterrupted over the constant radial height.

13. The rotor blade of claim 1, wherein the suction side tip rail consists of a forward portion and the aft portion, the forward portion of the suction side tip rail is continuous and uninterrupted along the suction side wall from the aft portion to the leading edge, the forward portion of the suction side tip rail defines a constant radial height, and the forward portion of the suction side tip rail is continuous and uninterrupted over the constant radial height.

14. A gas turbine, comprising; a compressor:
a combustor disposed downstream from the compressor;
a turbine disposed downstream from the combustor, the turbine including a rotor shaft extending axially through the turbine, an outer casing circumferentially surrounding the rotor shaft to define a hot gas path therebetween and a plurality of rotor blades interconnected to the rotor shaft and defining a stage of rotor blades, wherein each rotor blade comprises;
a mounting portion including a mounting body, the mounting body being interconnectable with the rotor shaft; and
an airfoil coupled to the mounting portion, the airfoil comprising: a leading edge;
a trailing edge downstream of the leading edge;
a root extending between the leading edge and the trailing edge;
a tip spaced radially outward from the root, the tip including a tip floor;
  a pressure side wall extending between the root and the tip and extending between the leading edge and the trailing edge;
  a suction side wall extending between the root and the tip and extending between the leading edge and the trailing edge, the suction side wall opposing the pressure side wall;
  a pressure side tip rail that extends radially outwardly from the tip floor between the leading edge and the trailing edge along the pressure side wall;
  a suction side tip rail that extends radially outwardly from the tip floor between the leading edge and the trailing edge along the suction side wall;
  a tip cavity defined by the tip floor, the pressure side tip rail and the suction side tip rail, the tip cavity defining a radial extent outward of the tip floor;
  a first slot formed in an aft portion of the suction side tip rail;
  an opening between the suction side tip rail and the pressure side tip rail at the trailing edge; and
  a second slot formed in the aft portion of the suction side tip rail, the second slot between the first slot and the opening;
  wherein gas flows from the tip cavity via the slot and the opening, and the gas flow from the tip cavity inhibits formation of a vortex flow proximate to the suction side wall.

15. The gas turbine of claim 14, wherein the second slot of the airfoil of the rotor blade is contiguous with the opening of the airfoil of the rotor blade.

16. The gas turbine of claim 14, wherein the first slot defines a height radially outward of the tip floor and the height of the first slot is less than the radial extent of the tip cavity.

17. The gas turbine of claim 14, wherein the aft portion of the suction side tip rail comprises half of the chordal extent of the suction side tip rail.

18. The gas turbine of claim 14, wherein the aft portion of the suction side tip rail comprises less than half of the chordal extent of the suction side tip rail.

19. The gas turbine of claim 14, wherein the first slot forms an angle between about twenty-five degrees and about sixty-five degrees with the suction side wall.

20. The gas turbine of claim 14, wherein the first slot forms an angle of about ninety degrees with the suction side wall.

* * * * *